United States Patent [19]

Mitchell et al.

[11] 3,731,176
[45] May 1, 1973

[54] DECELERATION AND STOP-LOCK MOTOR CONTROL APPARATUS

[75] Inventors: John O. Mitchell, Longmont; Spencer D. Roberts, Broomfield; Richard W. Van Pelt, Boulder, all of Colo.

[73] Assignee: International Business Machines Corporation, Armonk, N.Y.

[22] Filed: Apr. 21, 1972

[21] Appl. No.: 246,213

[52] U.S. Cl. .................................................318/619
[51] Int. Cl. ............................................G09b 11/06
[58] Field of Search.........................318/6, 369, 466, 318/569, 592, 594, 603, 619

[56] References Cited

UNITED STATES PATENTS 3,571,685  3/1971  Akins et al. .........................318/603
3,644,720  2/1972  Falk.................................318/619 X

OTHER PUBLICATIONS

IBM Technical Disclosure Bulletin, Vol. 12, No. 8, Jan. 1970, "Servo With Increased Gain at Null" by P. Hardy and H. E. Van Winkle, pages 1302, 1303.

Primary Examiner—Harold Broome
Assistant Examiner—W. E. Duncanson, Jr.
Attorney—Francis A. Sirr et al.

[57] ABSTRACT

A motor, moving at a known speed, is stopped in a controlled manner by a speed control servomechanism which compares the actual speed-versus-distance deceleration profile to an optimum or desired speed-versus-distance deceleration profile, and variably controls the reverse energization, or plugging, of the motor in a manner devised to achieve the desired profile. When the speed servo has reduced motor speed to a low level, and preferably zero, a stop-lock control servomechanism is enabled to position and maintain the motor at a preselected stop-lock position. The stop-lock servo implements a motor-control algorithm which, for a given position error, provides a higher magnitude motor energization when the motor is moving away from the stop-lock position than when the motor is moving back toward the stop-lock position. This control algorithm provides increased servo gain when the motor is moving away from the stop-lock position.

20 Claims, 6 Drawing Figures

DECELERATION AND STOP-LOCK MOTOR CONTROL APPARATUS

BACKGROUND AND SUMMARY OF THE INVENTION

This invention is related to the copending U.S. Pat. application of Philip J. Lima, Ser. No. 156,222, filed June 24, 1971, and commonly assigned.

This invention relates to the general field of electrical motive power systems wherein a deceleration interval is close-loop controlled, for example, by braking or plugging of the motor, followed by position control of the motor to stop-lock the motor at a pre-selected rest position.

This invention will be described in the general environment of the deceleration and stop-lock of a direct current motor. An environment in which this invention finds particular utility is that of the stop-control of the high torque — low inertia direct current capstan motor of a single-capstan magnetic tape unit, for example, a motor such as described in U.S. Pat. No. 3,490,672, issued to G. A. Fisher and H. E. Van Winkle.

Such a motor must quickly accelerate an associated magnetic recording tape from a rest position to a high speed, for example, 200 inches per second. This acceleration must be accomplished in a time interval less than a millisecond, and the tape must travel less than one tenth of an inch during this interval. At the end of this acceleration interval, the tape speed of 200 ips must be closely controlled as a read or a write operation is performed. After a block of data has been read or written, the capstan motor receives a stop command. The motor must come to rest at a position in the interblock gap which insures that the motor will be able to successfully accomplish a subsequent acceleration, as above described, reaching the speed of 200 ips at or before the end of the interblock gap, the total length of this gap being perhaps less than one-half inch.

The present invention is capable of closely stop-controlling such a motor from the known running speed to a preselected rest position in the interblock gap.

Prior art is known where the stop mode of a capstan motor is controlled by instituting position control of the motor when a stop command is received. Specifically, a reference signal representing the command stop position is compared to a feedback signal representing the actual motor position to thereby originate a position error signal. This error signal is quite large at the instant the stop command is received, and reduces in magnitude as the motor approaches the command position. After the motor has been brought to rest, it is stop-locked at this position by virtue of a continuous comparison of the actual motor position to the command or desired motor position.

Other prior art is known where a position controlled stop, such as above described, is modified by increasing the gain of the position servo when the motor nears the command position.

The present invention provides a unique position control of stop-lock mode of operation which is sensitive not only to the actual motor position but also to the direction in which the motor is moving relative to the command position, and through the use of a filter, to the rate of motion.

Specifically, the present invention generates a position-error signal as a result of a comparison of actual motor position to desired motor position. If the motor is moving away from the desired position, this position-error signal is modified in a manner to effectively increase its effect on control of the motor. Specifically, the gain of the motor servo is increased. In addition to changing the gain, the present invention increase the dead band when the motor reverses direction and starts moving back toward the desired position.

More specifically, the position-error signal is generated as a binary number to be applied to the input of a digital-to-analog converter (DAC) through a register. When the motor is moving away from the desired position, this digital number is shifted and entered into high-order stages of the register. As a result, the motor control algorithm dead band is smaller when the motor is moving away from the desired position.

As a further feature of the present invention, the step type output of the DAC is applied to a signal modification network whose output contains not only a component related to position error, but also a component related to the rate at which the error is changing, that is, the rate at which the motor is moving. More specifically, this signal modification network is a lead-type filter, and preferably a lead-bag filter wherein the lead effect is dominant, thereby providing velocity damping.

As a further feature of the present invention, the initial interval of motor stop control is achieved by a speed control mode of operation which variably controls the magnitude of motor braking energization, or plugging, in a manner devised to achieve zero motor speed at substantially the command position, whereupon the above-described stop-lock mode of operation is instituted.

Specifically, this initial speed control mode of operation may be described in the above-mentioned copending patent application of P. J. Lima, wherein the actual speed-versus-distance deceleration profile of the motor is compared to a desired or optimum speed-versus-distance profile, and the motor plug-energization is modified in a manner devised to achieve the desired profile. In accordance with the present invention, this speed control mode of operation may include the use of a lag type filter.

The foregoing and other features and advantages of the invention will be apparent from the following more particular description of preferred embodiments of the invention, as illustrated in the accompanying drawings.

DESCRIPTION OF THE PREFERRED EMBODIMENTS

Figure 1:
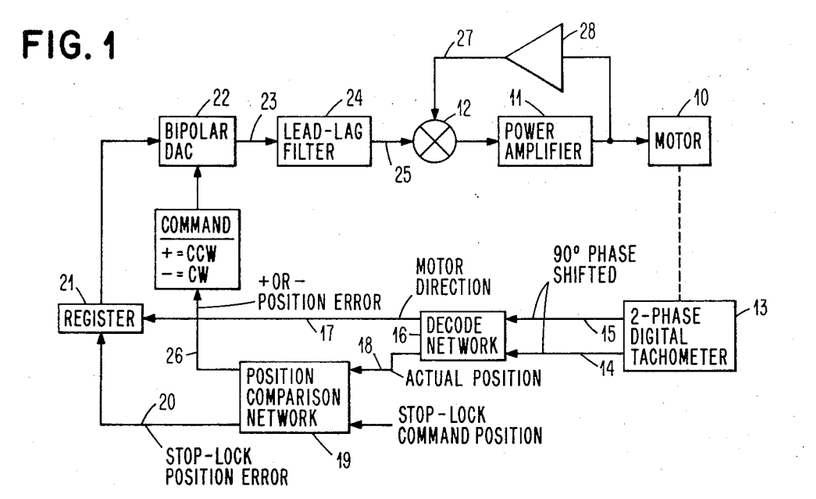
FIG. 1 is a block diagram schematic of the stop-lock control portion of the present invention.
Figure 2:
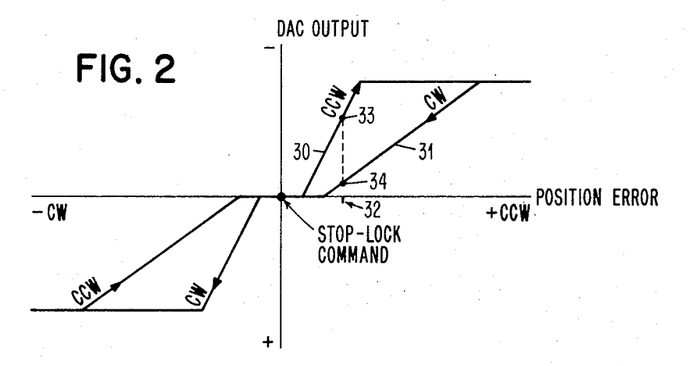
FIG. 2 is a graphical representation of the motor position-control algorithm implemented by the apparatus of FIG. 1.

FIG. 1 is a block diagram schematic of the stop-lock control portion of the present invention. The function of the apparatus disclosed in FIG. 1 is to implement the motor control algorithm shown in FIG. 2. FIG. 2 plots motor position error as a function of DAC output and shows that for a given position error, outside the dead band of the apparatus, the DAC output is of a higher magnitude when the motor is moving away from the stop-lock command position than when the motor is moving in a direction returning to this command position.

Referring to FIG. 1, motor 10, which may be a high torque — low inertia direct current motor as above mentioned, is energized from the output of power amplifier 11. The input of the power amplifier is connected to summing junction 12. Rotation of motor 10 causes rotation of a two-phase digital encoder or tachometer 13, this tachometer preferably being an integral part of motor 10. While the following description will deal with an incremental encoder, the present invention is not to be limited thereto. For example, an absolute position encoder can be used to generate the same required speed and position information. The output of tachometer 13 consists of two 90° phase-shifted alternating signals 14 and 15. These signals carry motor direction information by virtue of the phase relationship of the two signals. Motor speed information is carried by the frequency component of either of these signals, and more specifically by the time interval or period between pulses, full cycles, or portions of cycles of one or both of these signals.

Decode network 16 receives these signals and decodes the two signals to provide a direction output on conductor 17 indicating clockwise or counterclockwise rotation of the motor, and a position output on conductor 18 indicating the position of the motor. The position of the motor is compared to the stop-lock command position by comparison network 19. The output of net-work 19, on conductor 20, is a signal indicative of the difference between the actual motor position and the stop-lock command position, namely the stop-lock position error.

This position error is applied as input to network 21. This network is capable of modifying the position error signal to effectively increase its magnitude if the motor direction signal on conductor 17 indicates that the motor is moving away from the stop-lock command position. Specifically, network 21 is a register capable of receiving a binary position error number from conductor 20. If the signal on conductor 17 indicates that the motor direction is toward the stop-lock command position, this binary number is shifted directly into the register. However, should the motor be moving away from the stop-lock command position, this binary position error number is shifted to higher order stages of the register; and the magnitude of the position error is thus effectively increased.

The output of register 21 is connected as an input to bipolar DAC 22, whose analog output appears on conductor 23. This analog output passes through a signal modifying network in the form of a lead-lag filter 24 to thereby apply a filtered analog output to summing junction 12 by way of conductor 25.

Comparison network 19 also originates a direction command signal on conductor 26, indicating that the motor must be energized positively to produce counterclockwise rotation of the motor and thereby return to the stop-lock command position whenever a negative or clockwise position error is detected. If a counterclockwise or positive position error is detected, then the signal on conductor 26 indicates that the motor must be energized negatively to produce clockwise rotation of the motor, thereby returning the motor to the stop-lock command position. This signal is used to determine the polarity of the DAC output.

For current mode operation, the second input to summing junction 12 is a negative feedback signal on conductor 27, this signal being indicative of the magnitude of motor energization. For example, this signal may be derived by measuring the armature current of motor 10 and connecting this measured signal through operational amplifier 28 to summing junction 12. If voltage mode is selected, no such second input is provided.

Describing a cycle of operation of the apparatus of FIG. 1, with reference to FIG. 2, it will first be assumed that the actual motor position is coincident with the stop-lock command position. In this case, the position error signal is zero and the apparatus of FIG. 1 can be visualized as existing at the origin of the coordinate system of FIG. 2. If the motor now moves away from the stop-lock command position, in a counterclockwise direction, no control effect begins until the positive position error has increased to leave the narrow dead band of the control system. As soon as the dead band has been exceeded, motor 10 is energized in accordance with curve 30 of FIG. 2. The gain of the control system is defined as the incremental change in DAC output for an incremental change in position error. From this, it can be seen that the gain of curve 30 is greater than the gain of curve 31.

Since the motor has moved in a counterclockwise direction, the DAC output is interpreted as requiring clockwise rotation of the motor to return the motor to the stop-lock command position. As a result, the motor is negatively energized. This energization of the motor will, at some position error point, reverse movement of the motor from counterclockwise to clockwise. For example, this reversal may occur at the position error represented by numeral 32. As soon as a change in motor direction is detected, the motor energization is reduced from that represented by point 33 to that represented by point 34. In other words, the magnitude of motor energization is reduced; and the gain of the control system is lowered to that represented by curve 31. Thereafter, the motor continues rotating in a clockwise direction, returning to the now-wide dead band of the system and coasting to the stop-lock command position.

The above description, particularly with regard to FIG. 2, does not preclude the case where the motor receives some finite energization when motor position error is zero, such energization being required in order for the motor to oppose a load tending to move the motor.

Figure 3:
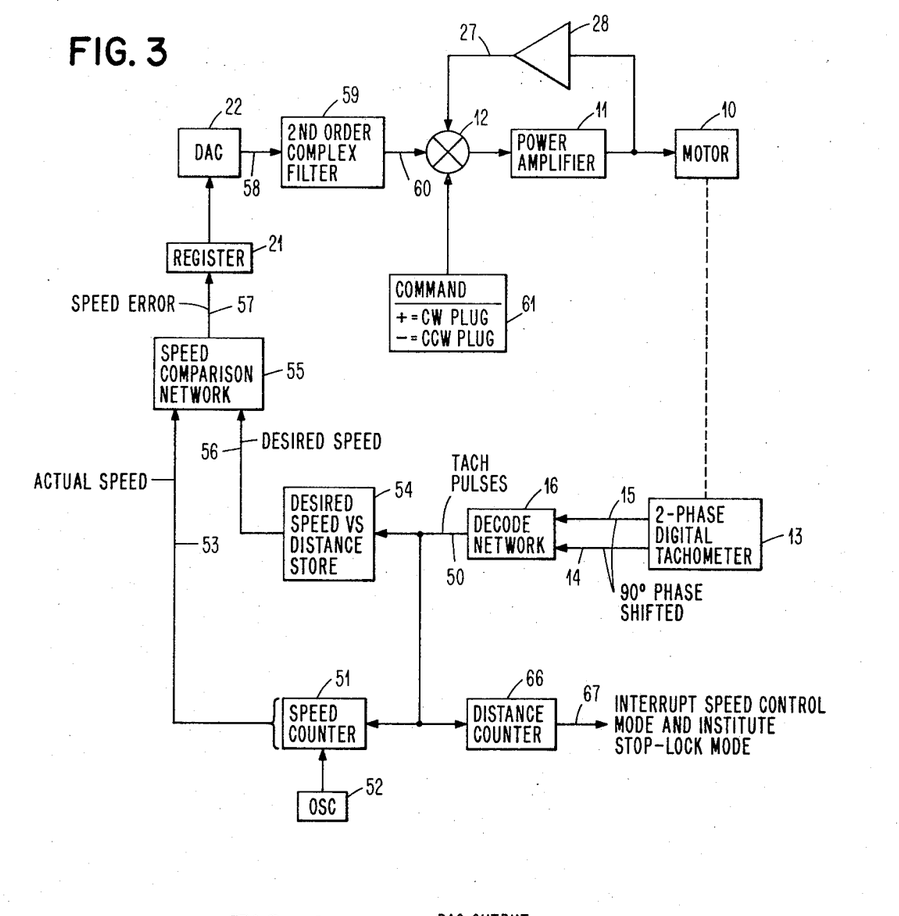
FIG. 3 is a block diagram schematic of the speed control portion of the present invention, that is, the portion of the present invention adapted to achieve substantially zero motor speed prior to enabling the stop-lock control portion shown in FIG. 1.

The above description has assumed that motor 10 is nominally at rest at the stop-lock command position. FIG. 3 is a block diagram schematic of the speed control portion of the present invention, that is, the portion of the present invention which is adapted to achieve the substantially zero motor speed prior to institution of the stop-lock motor control apparatus above described in connection with FIGS. 1 and 2. The apparatus disclosed in FIG. 3 implements the motor speed control algorithm graphically represented in FIG. 4 and decelerates the motor from a known running speed to rest or zero speed. By way of example, motor 10 may be the above-described DC capstan motor whose nominal running speed causes associated magnetic recording tape to move at a speed of 200 ips. Certain structural elements are common to the speed control apparatus of FIG. 4 and the position control apparatus of FIG. 1. These various structural elements have been designated by the use of the same reference numerals in these two figures.

The function of the apparatus of FIG. 3 is to compare the actual speed-versus-distance deceleration profile of motor 10 to a desired speed-versus-distance profile and to variably control the reverse energization or plugging of motor 10 in a manner to achieve the desired profile. Another function of the apparatus of FIG. 3 is to inhibit further operation of the speed control servo when the motor has been brought to substantially zero speed and to thereafter enable the position control servo of FIG. 1 to stop-lock motor 10 at the preselected command position.

With reference to FIG. 3 it will be assumed that motor 10 is traveling at a known uniform speed when a stop command, not shown, is received. This stop command is effective to institute operation of this speed controlled deceleration apparatus. The speed control mode is continued, as if a stop command had not been received, for a short time until the first transition of one of the signals 14 or 15 is received. When this first transition is received, deceleration begins.

Specifically, decode network 16 provides tachometer pulses on output conductor 50. These pulses are applied to an oscillator driven speed counter 51. Considering two adjacent tachometer pulses, the first pulse after the stop command resets velocity counter 51 to an initialized state whereupon oscillator 52 is thereafter effective to increment counter 51, advancing the count therein until the second tachometer pulse is received. At the time of occurrence of the second tachometer pulse, the count contained in counter 51 is gated to output conductor 53. The magnitude of this count represents the speed of the motor. Namely, this number increases in magnitude as the speed of motor 10 decreases. Thus, the signal present on conductor 53 is changed upon the occurrence of each tachometer pulse; and, since the motor is decelerating, this number increases in a step fashion upon the occurrence of each tachometer pulse.

The tachometer pulses present on conductor 50 are also applied to a memory network in the form of a desired speed-versus-distance read-only store 54. Store 54 contains a unique number for each tachometer pulse. This number indicates the number which should exist in velocity counter 51 for that particular tachometer pulse, if motor 10 is at the desired speed for the distance represented by the particular tachometer pulse. Speed comparison network 55 compares the actual-speed signal on conductor 53 to the desired-speed signal on conductor 56, and originates a speed-error signal on conductor 57 as a result of that comparison. This speed-error signal, for example, in the form of a binary number, is presented as input to register 21 and thereby to the input of DAC 22. The output of DAC 22, at conductor 58, provides an analog input to second-order complex pole filter 59, whose output 60 then provides a filtered analog output to summing junction 12. As is well known to those skilled in the art, filter 59 provides a lag function and serves the purpose of accepting a step output from DAC 22 without exciting mechanical resonance in motor 10 and its load, while at the same time ensuring that the motor follows a smooth deceleration curve.

While filter 59 has been shown as a preferred element, it is possible to eliminate the filter if motor 10 has a high mechanical resonant frequency, and/or the magnitude of motor energization does not excite motor resonance.

Figure 4:
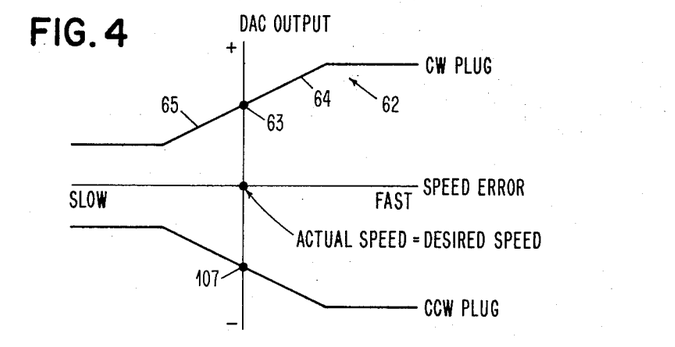
FIG. 4 is a graphical representation of the motor speed control algorithm implemented by the apparatus of FIG. 3.

Referring to FIG. 4, this representation of the algorithm implemented by the structure of FIG. 3 plots the speed error as a function of the DAC output. For system stability, the DAC output may be limited for a large speed error. If it is assumed that the motor has been moving at a uniform speed in a counterclockwise direction, then the apparatus of FIG. 3 produces the motor energization identified as "CCW plug" to reduce the speed of the motor in a controlled manner. By definition, "CCW plug" is equivalent to the mode of motor energization which would produce CW motor rotation, if the motor were at rest. In FIG. 3, this direction command is provided by means 61.

If a clockwise (CW) plug is to be performed to achieve deceleration, the control of motor 10 by the structure of FIG. 3 follows the algorithm of curve 62, FIG. 4. If the comparison of desired speed to actual speed, by comparison network 55 (FIG. 3), indicates that the actual speed is equal to the desired speed, the degree of clockwise plugging energization applied to motor 10 is represented by point 63 on curve 62. If motor 10 is moving at a speed faster than the desired speed, the degree of counterclockwise energization increases along the portion 64 of the curve, whereas if the motor is slow relative to the desired deceleration profile, the degree of counterclockwise plugging energization is reduced along the portion 65 of the curve.

In this manner, controlled deceleration of motor 10 results in the motor speed dropping from 200 ips to substantially zero. The structure of FIG. 3 measures the distance which has been traversed since the occurrence of the stop command, and senses the arrival at a preselected distance checkpoint to interrupt the speed control mode and to thereafter institute the stop-lock control mode by enabling the apparatus of FIG. 1. Specifically, distance counter 66 receives the tachometer pulses on output conductor 50 and provides an output on conductor 67 when a given distance checkpoint is reached, it being known that the motor speed is nominally zero, or at least only slightly greater than zero, when this distance checkpoint is reached. The output on conductor 67 is effective to inhibit the speed control apparatus of FIG. 3 and to thereafter enable operation of the position control apparatus of FIG. 1 to stop-lock motor 10 at the stop-lock command position, in the manner above described.

Figure 5:
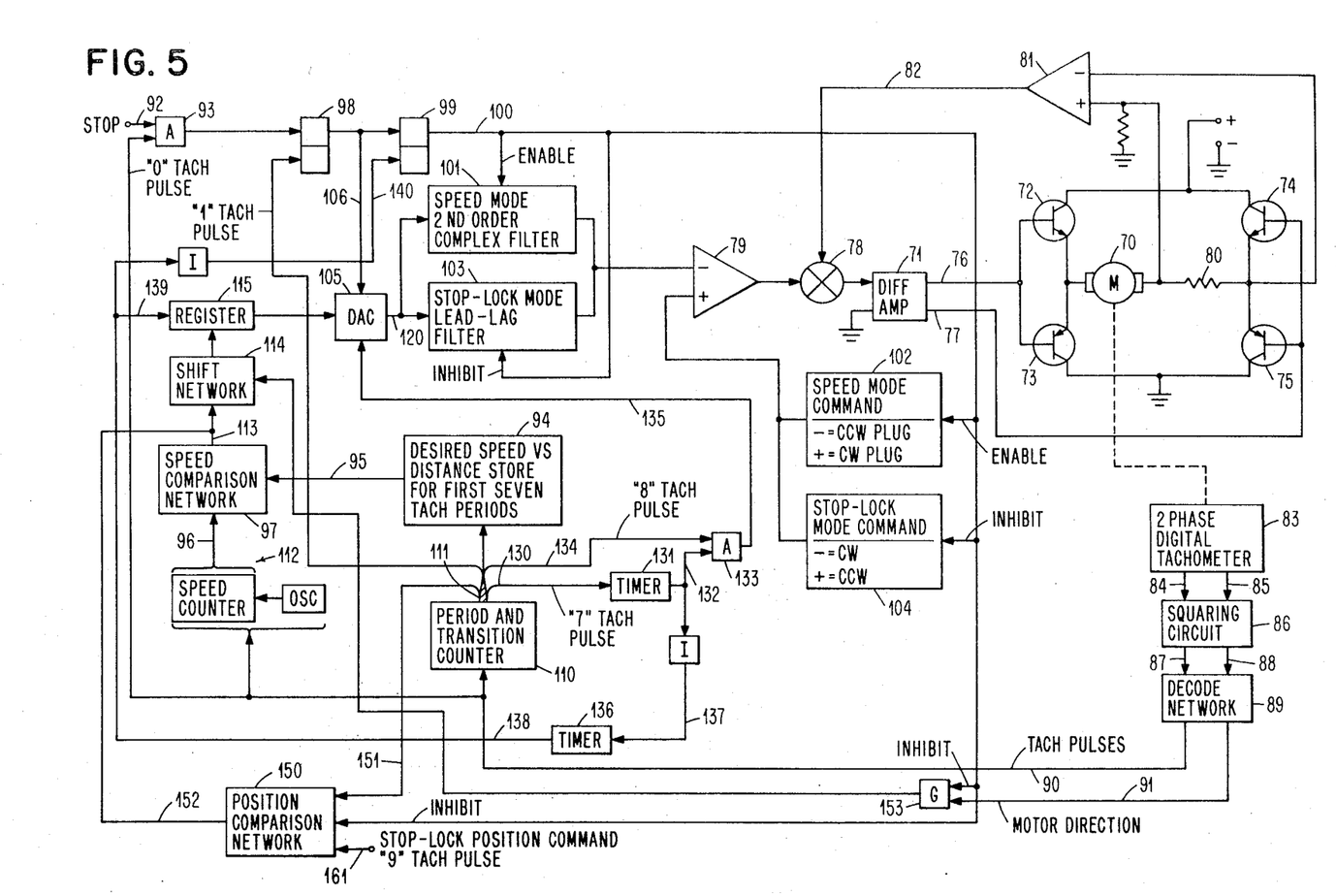
FIG. 5 is a schematic of an embodiment of the present invention incorporating both the speed control and the stop-lock portions of the present invention, this embodiment implementing the motor-control algorithms of FIGS. 2 and 4.

The above description of the present invention, as shown in FIGS. 1–4, is an aid to understanding the underlying concepts of the present invention. FIG. 5 is a schematic representation of an embodiment of the present invention which incorporates both the speed control and the stop-lock portions of the present invention in a single structure, so as to implement the motor-control algorithms of FIGS. 2 and 4.

With reference to FIG. 5, DC motor 70 is energized by a power amplifier including an input differential amplified 71 and a bridge-type circuit having transistors 72, 73, 74 and 75. By way of example, transistors 72 and 75 are selected by a positive-to-negative voltage on output conductors 76 and 77 of differential amplifier 71. When these two transistors are conductive, current flows from left-to-right through motor 70. The magnitude of this current is controlled by the magnitude of the voltage existing between conductors 76 and 77. A reversal of the polarity of the voltage between conductors 76 and 77 selects transistors 73 and 74 and the motor is energized with current flowing from right-to-left. Differential amplifier 71 receives an input signal from summing junction 78, this summing junction being connected to the output of operational amplifier 79. Resistor 80 in series with the armature of motor 70 provides for sensing the magnitude of motor energization. Specifically, the magnitude and direction of the armature current is sensed. The voltage developed across resistor 80 is applied as input to operational amplifier 81, whose output 82 is applied as negative feedback to summing junction 78.

Motor 70 is connected to drive two-phase digital tachometer 83. The two 90° phase-shifted output signals 84 and 85 of this tachometer are applied to squaring circuit 86. The output of the squaring circuit ideally consists of two 90° phase-shifted squarewave signals on conductors 87 and 88. This produces four detectable signal transitions for each full cycle of either signal. All four transitions are used as position information. These two signals are applied to decode network 89 whose output signals consist of tachometer pulses on conductor 90 and a motor direction signal on conductor 91.

The time interval between adjacent tachometer pulses on conductor 90 is a measure of the speed of motor 70. The phase relationship between the two signals 87 and 88 is a measure of the direction in which the motor is rotating. Because of imperfect symmetry of the tachometer signals, a full cycle of either signal is generally used for velocity information. However, all four signal transitions are counted during the speed-deceleration mode for later use in the position mode.

When a stop command appears at conductor 92, the apparatus of FIG. 5 reverse energizes or plugs motor 70. However, the beginning of the deceleration interval is delayed by AND 93 since this gate is not enabled until a tachometer transition occurs on conductor 90.

Thus, the beginning of deceleration is synchronized with the first tachometer transition. This tachometer transition has been designated the "0" tachometer pulse. This first transition after a stop command may be any one of the four possible transitions in one cycle. Thus, the time interval between the "0" tachometer pulse and the next tachometer pulse (four transitions later), designated the "1" tachometer pulse, is the first tachometer period. The interval between the "1" and the "2" tachometer pulse (four additional transitions, or a total of either transitions) is designated the second tachometer period, and so forth. Memory device 94 is the desired speed-versus-distance read-only store for the first seven tachometer periods. As will be described, the tachometer pulses on conductor 90 are effective to select a unique desired-speed number from store 94 and to apply this desired-speed number as an output on conductor 95. This desired speed is compared to the actual motor speed (conductor 96) by speed comparison network 97.

Returning to the enabling of AND 93 by the "0" tach pulse, the output of AND 93 sets latch 98 which in turn sets latch 99. The output of latch 99, at conductor 100, is effective to enable speed mode filter 101 and speed mode command 102, while at the same time inhibiting stop-lock filter 103 and stop-lock command 104. The output of latch 98 is also effective to enter a nominal plugging number into DAC 105 by way of conductor 106. With reference to FIG. 4, this nominal DAC number is represented by point 63 if motor 70 is turning in a clockwise direction and is represented by point 107 if the motor is turning in a counterclockwise direction. Thus, for the interval between the "0" and the "1" tach pulse, the motor is plugged a nominal amount, it being assumed that during this interval the motor speed is very nearly equal to the desired speed.

As motor 70 progresses into the speed-versus-distance deceleration profile, period counter 110 counts the tachometer pulses and provides an output on output means 111 at the end of each of the first eight tachometer periods. At the end of the first tachometer period, the "1" tach pulse resets latch 98 and thereafter motor 70 is controlled by comparison network 97. More specifically, the count contained within speed counter 112 upon the occurrence of the "1" tach pulse, is indicative of the speed of the motor at this distance checkpoint. This speed is compared to the desired speed at this checkpoint and a number indicative of speed error is provided at the output 113 of comparison network 97. If the actual speed is equal to the desired speed, the number at the output of comparison network 97 achieves the DAC output represented by points 63 or 107 of FIG. 4. This number passes through shift network 114 to the input of register 115. Shift network 114 performs no function when the apparatus is operating in the speed mode.

In this manner, the reverse energization or plugging of motor 70 is variably controlled from the second through the eighth tachometer period.

It will be recognized that the analog output of DAC 105, on conductor 120, remains at a steady-state magnitude during a tachometer period. At the end of a tachometer period, the output of the DAC most likely experiences a step change in magnitude. Speed mode filter 101 is a second-order complex pole filter and essentially accomplishes a lag function to prevent exciting mechanical resonance in motor 70 and ensuring that the speed of the motor decreases in a smooth manner.

It will be remembered that the speed of motor 70 continually decreases during the first eight tachometer periods. Thus, the time between tachometer pulses (conductor 90) is relatively long as the motor approaches zero speed. Thus, the speed information represented by speed counter 112 may become relatively inaccurate in the later tachometer period. As a result, the end of the seventh tachometer period (the occurrence of the "7" tach pulse) provides an output on conductor 130 to institute operation of timer 131. The timing period of timer 131 is nominally longer than the eighth tach period (the interval between the "7" and the "8" tach pulse). During the timing interval of timer 131, a first conditioning input 132 is provided to AND 133. At the end of the eighth tach period (the occurrence of the "8" tach pulse), an output is provided on conductor 134 and AND 133 is conditioned to set a nominal plug number into DAC 105 by way of conductor 135. This number restores motor energization to either point 63 or point 107 of FIG. 4.

This nominal number is effective to control motor-plug energization until the end of the timing period of timer 131. This results in closed-loop use of this nominal number, in accordance with the length of the eighth tach period. Namely, the faster the motor speed (the shorter the tach period), the longer time that this number will be used for motor-plug energization.

At the end of the first timing interval, provided by timer 131, a second timer 136 is started by an input on conductor 137. During the second timing period, provided by timer 136, an output appears on conductor 138. This output sets a number into register 115, by means of conductor 139, which commands zero motor energization. During this second timing period, the output of filter 101 and the current flowing through the armature of motor 70 decay to zero. Nominally, motor 70 is at rest at the end of this second time period.

At the end of the second timing period, an output is provided on conductor 140 and latch 99 is reset. The resetting of latch 99 inhibits operation of the speed control servo and enables operation of the stop-lock servo. Stop-lock filter 103 and stop-lock command 104 are now enabled whereas speed filter 101 and speed command 102 are inhibited.

Position comparison network 150 is now effective to compare a desired stop-lock position command, for example, the "9" tach pulse position or a total of 36 transitions (conductor 161), to the actual motor position represented by the output of period counter 110, on conductor 151. The present invention is also useful to produce a backhitch in motor movement, as by selecting a stop-lock position, such as the "6" tach pulse, which requires reverse movement, or backhitch, of the motor.

The output of position comparison network 150, at conductor 152, is applies as input to shift network 114. With gate 153 no longer inhibited, the motor direction signal on conductor 91 controls shift network 114 in a manner to increase the magnitude of the position error number on conductor 151 if motor 70 is moving away from the stop-lock command position. In this manner, the gain of the stop-lock control apparatus is increased so long as the motor continues to move away from the stop-lock position.

The output of shift network 114 is provided to register 115 and the analog output 120 of DAC 105 passes through stop-lock filter 103 to control motor 70.

Figure 6:
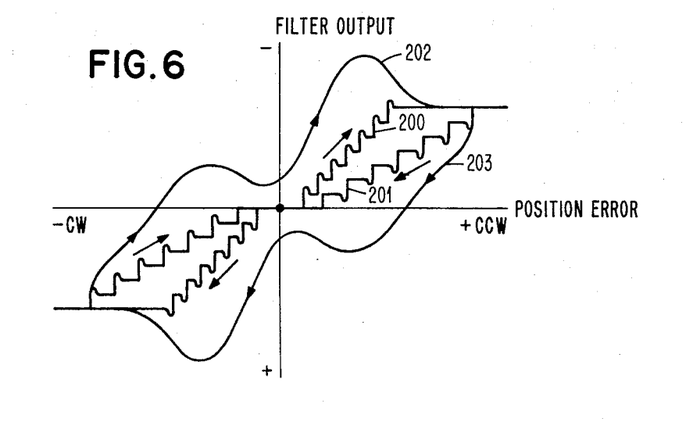
FIG. 6 is a graphic representation of the motor position-control algorithm implemented by the apparatus of FIG. 5, this graph more accurately depicting the output of the stop-lock filter and showing how for low motor speeds this output approximates the DAC output, whereas for high motor speeds this output is modified by the equivalent of a rate-feedback effect.

FIG. 6 is a graphical representation of the motor position-control or stop-lock algorithm implemented by the apparatus of FIG. 5, having changeable gain and dead band. This graph more accurately depicts the output of stop-lock filer 103, and shows the manner in which this output is changed, primarily by the lead characteristic of the filter, when the speed of the motor, either toward or away from the stop-lock position, is relatively high. With reference to FIG. 6, the staircase patterns 200 and 201 represent the output of filter 103 when the motor is moving at a relatively slow speed, pattern 200 representing movement of the motor away from the stop-lock position and pattern 201 representing movement of the motor back toward the stop-lock position. In this case, the output of filter 103 closely approximates the output of DAC 105. However, should motor 70 be moving with high speed, the output of filter 103 becomes that represented by curves 202 and 203. The portion of curve 202 in the first quadrant represents the output of filter 103 when the motor is moving away from the stop-lock position, whereas the portion of curve 203 in the first and fourth quadrants represents the output of the filter when the motor is moving back toward the stop-lock position. From this figure, the unique operation of filter 103 can be readily appreciated since rapid movement of motor 70 away from the stop-lock position provides even greater motor energization 202 to return the motor to the stop-lock position than is provided by curve 200. Also, when the motor is returning toward the stop-lock position at a high speed, curve 203 reduces the magnitude of the energization driving the motor back toward the stop-lock position, and in fact is capable of plugging the motor as curve 203 falls below the abscissa of the coordinate system.

While the invention has been particularly shown and described with reference to preferred embodiments thereof, it will be understood by those skilled in the art that various changes in form and details may be made therein without departing from the spirit and scope of the invention.

What is claimed is:

1. Stop control apparatus for bringing a motor to a zero speed condition and for maintaining the motor stop-locked at a given position, comprising:

transducing means controlled by said motor and providing motor speed, motor distance, and motor direction information;

speed-control means controlled by said transducing means and operable upon the occurrence of a stop command to control motor energization in a manner devised to achieve subsequent zero motor speed;

stop-lock control means controlled by said transducing means and operable subsequent to operation of said speed control means to stop-lock said motor at a given position; and means responsive to a stop-lock position error and to the direction of motor movement relative to said given position to energize said motor in a manner to return said motor to said given position, said last-named means being constructed and arranged to implement a control algorithm providing increased gain and increased motor energization when the motor is moving away from said given position.

2. Stop control apparatus as defined in claim 1 wherein said last-named means is additionally constructed and arranged to implement a control algorithm providing decreased dead band when the motor is moving away from said given position.

3. Stop control apparatus as defined in claim 1 wherein said speed control means includes means operable to compare the actual speed versus distance profile of motor deceleration to an optimum speed versus distance profile and to originate a speed-error signal as a result of said comparison, and including a lag-type filter connected to receive said speed-error signal as an input, said filter providing a filtered output to control motor energization.

4. Stop control apparatus as defined in claim 1 wherein said stop-lock control means includes means operable to compare the actual motor position to said given position and to originate a position-error signal as a result of said comparison, and including a lead-type filter connected to receive said position-error signal as an input, said filter providing a filtered output to control motor energization.

5. Stop control apparatus as defined in claim 1 including first and second filter means, power amplifier means connected to said motor and operable to energize said motor in both the speed and stop-lock modes of operation of said stop control apparatus, and means operable to connect said first filter in a circuit with said power amplifier means when the stop control means is operating in the speed mode, and to connect said second filter in circuit with said power amplifier means when the stop control apparatus makes a transition from the speed mode to the stop-lock mode.

6. Stop control apparatus as defined in claim 1 wherein said transducing means includes a digital encoder and sampled-data means controlled thereby to periodically provide updated speed, distance, and direction information, said speed control means being responsive to said transducing means as the speed of said motor decreases to a speed slightly greater than zero speed, whereupon control of said motor by said speed control means is interrupted; and delay means operable to delay operation of said stop-lock control means, such that said stop-lock control means is rendered operable when said motor speed is approximately zero.

7. Stop control apparatus as defined in claim 6 wherein said speed control means is operable to reverse energize said motor, and wherein said motor is de-energized during the timing period of said time delay means.

8. Stop control apparatus as defined in claim 7 wherein said digital encoder provides an output pulse for each unit of movement of said motor and wherein speed information is generated by digital means in the form of a number whose magnitude represents the time interval between adjacent output pulses of said encoder, wherein said distance information is generated by digital means in the form of a number whose magnitude represents the sum of the output pulses received from said encoder; and wherein the digital means providing said distance information is operable to interrupt operation of said speed control means at a predetermined distance relative to said given position.

9. Stop control apparatus as defined in claim 8 wherein said speed control means is operable to periodically compare the speed information number to a number representing a desired motor speed at a given distance position and to generate a speed-error number as a result of said comparison, wherein a predetermined distance information number is effective to interrupt operation of said speed control means; and wherein said stop-lock control means is operable after the timing period of said time delay means to compare the distance information number to a number representing said given position and to generate a stop-lock position error number as a result of said comparison.

10. Stop control apparatus as defined in claim 9 including a digital-to-analog converter connected to receive said speed error number when said speed control means is operable, connected to receive a speed error number equal to a command for motor deenergization during the timing period of said time delay means, and connected to receive said position error number after the timing period of said time delay means; including power amplifier means having an output connected to control energization of said motor and having an input connected to receive the output of said digital-to-analog converter; and means controlled by the direction information provided by said transducing means and connected to control the transfer of said position-error number to said digital-to-analog converter in a manner to effectively increase the magnitude of said number when the motor is moving away from said given point.

11. Stop control apparatus as defined in claim 10 including first and second filter means selectively adapted to be connected intermediate said digital-to-analog converter and the input of said power amplifier means, and means operable to select said first filter when the stop control apparatus is operating in the speed mode, and to select said second filter when the stop control apparatus is operating in the stop-lock mode.

12. Stop control apparatus as defined in claim 11 wherein said first filter is a lag-type filter and wherein said second filter is a lead-type filter.

13. Stop control apparatus as defined in claim 12 including feedback means connected to said motor and providing a negative feedback signal to the input of said power amplifier means in accordance with the magnitude of the energization of said motor by the output of said power amplifier means.

14. Stop-lock control means for maintaining a motor at a stop-lock position, comprising:
transducing means controlled by said motor and providing motor distance and motor direction information output signals;
means responsive to the distance output signal of said transducing means and operable to compare said signal to a signal representing the stop-lock position to thereby generate a position-error signal; and motor control means responsive to said position-error signal and to the direction output signal of said transducing means to energize said motor in a manner to return said motor to said stop-lock position, said motor control means being constructed and arranged to implement a motor-control algorithm providing increased gain and increased motor energization when the motor is moving away from said stop-lock position.

15. Stop-lock control means as defined in claim 14 wherein said motor-control means is additionally constructed and arranged to implement a motor-control algorithm providing decreased dead band when the motor is moving away from said stop-lock position.

16. Stop-lock control means as defined in claim 14 wherein said transducing means includes a digital encoder providing an output pulse for each increment of movement of said motor, wherein said distance output signal is a number whose magnitude is an algebraic summation of the units of motor movement away from and back toward said stop-lock position; and wherein said motor control means includes means to compare said number to a number representing the stop-lock position to thereby originate a position-error number whose magnitude is a measure of the position of said motor relative to said stop-lock position.

17. Stop-lock control means as defined in claim 16 wherein said motor control means includes power amplifier means having an input and having an output connected to energize said motor, a digital-to-analog converter connected to receive said position-error number and providing an analog output to the input of said power amplifier means, and means responsive to said direction output signal and connected to effectively increase the magnitude of said position-error number when said motor is moving away from said stop-lock position.

18. Stop-lock control means as defined in claim 17 wherein said motor control means includes a signal modifying network connected to receive the output of said digital-to-analog converter and to provide an analog output to the input of said power amplifier means, said analog output having a rate-of-motor movement component.

19. Stop-lock control means as defined in claim 18 wherein said signal modifying network is a lead-type filter.

20. Stop-lock control means as defined in claim 19 including feedback means connected to said motor and providing a negative feedback to the input of said power amplifier means in accordance with the magnitude of energization of said motor.

* * * * *